United States Patent [19]

Baker et al.

[11] 3,958,447

[45] May 25, 1976

[54] MASS FLOWMETER

[75] Inventors: Roger E. Baker, Redmond; Le Roy E. Vetsch, Lynnwood, both of Wash.

[73] Assignee: Eldec Corporation, Lynnwood, Wash.

[22] Filed: July 9, 1975

[21] Appl. No.: 594,604

[52] U.S. Cl. .................................. 73/32 R; 73/196; 73/231 M
[51] Int. Cl.² ...................... G01F 1/12; G01F 1/76; G01N 9/32
[58] Field of Search ........... 73/194 M, 231 M, 32 R, 73/196

[56] References Cited
UNITED STATES PATENTS 3,306,105  2/1967  Ichihara et al. .................. 73/194 M Primary Examiner—James J. Gill
Attorney, Agent, or Firm—Christensen, O'Connor, Garrison & Havelka

[57] ABSTRACT

A flowmeter in which first and second sets of electrical signals representative, respectively, of the mass flow rate and the volumetric flow rate of a fluid are used to generate an adjusted mass flow rate signal which is representative of the mass flow rate and which reflects changes in flow rate substantially as they occur. Means are provided to generate a control signal representative of the density of the fluid, the control signal in turn being applied to a multiplier circuit which multiplies the volumetric flow rate signal by the control signal to generate the adjusted mass flow rate signal. The control signal is generated by comparing the first set of signals, which are representative of the mass flow rate, with a delayed portion of the adjusted mass flow rate signal, an inequality between the first set of signals and the adjusted mass flow rate signal resulting in a corresponding change in the magnitude of said control signal.

8 Claims, 5 Drawing Figures

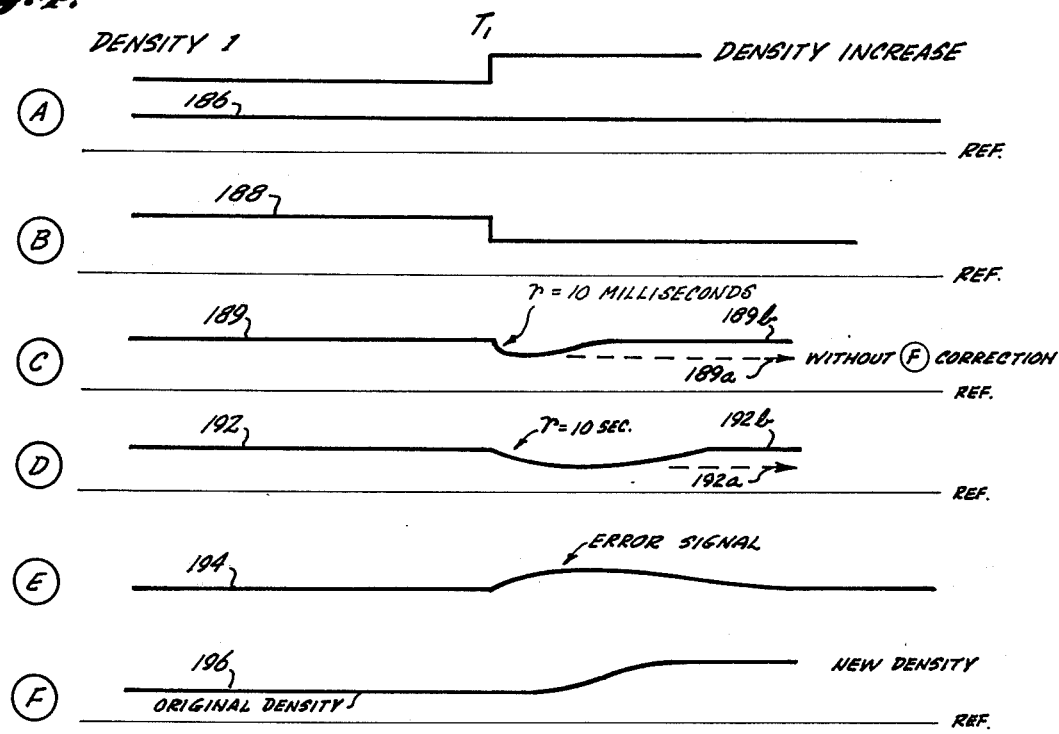
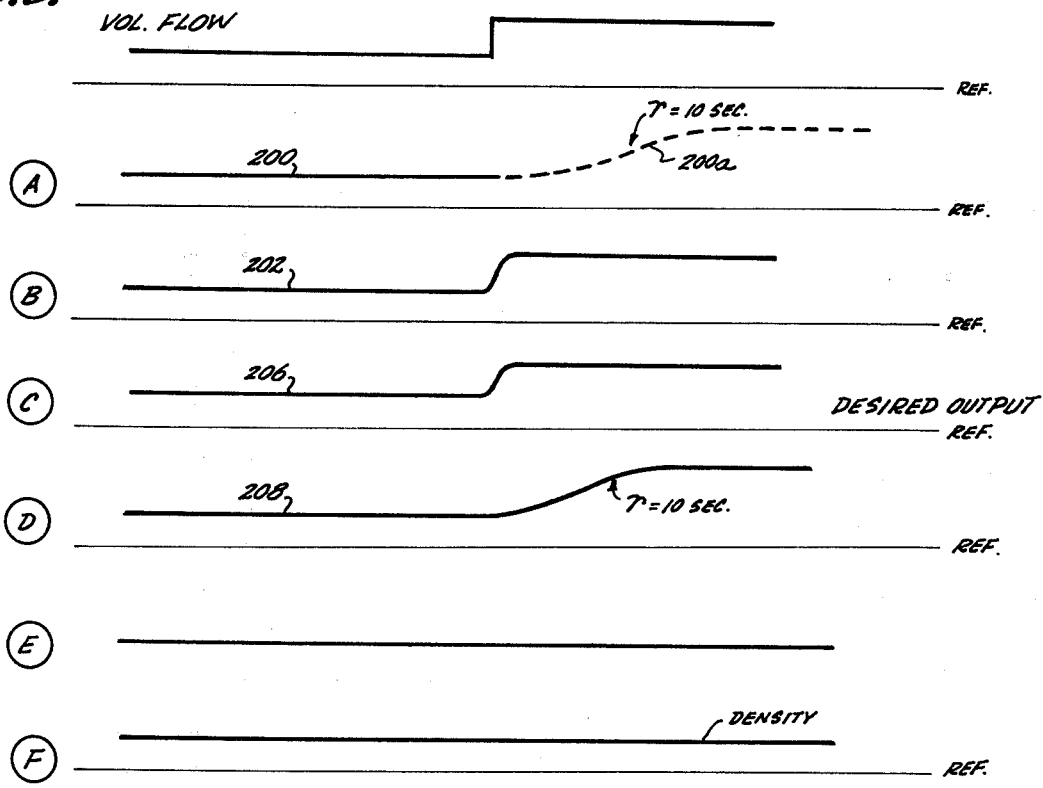

MASS FLOWMETER

BACKGROUND OF THE INVENTION

This invention relates generally to the flowmeter art, and more particularly concerns apparatus which measure the rate of a flowing fluid.

Flowmeters producing electrical signals representative of the mass flow rate of a fluid, such as fuel or gas, are well known. Similarly, flowmeters producing electrical signals representative of the volume flow rate of a fluid are also well known. One type of mass flowmeter includes a positively driven central shaft, a rotating drum connected to the shaft, on which drum is positioned a plurality of spaced magnets, and an impeller assembly having numerous openings positioned therein, permitting fluid to flow therethrough, the impeller being connected to the drum shaft by a spring. In operation, the positively driven shaft continuously rotates the drum which is spring coupled to the impeller assembly. The greater the fluid flow rate, the greater the quantity of fluid to which the impeller must impart angular momentum, and the greater the angular deflection of the coupling spring.

The magnets located on the periphery of both the drum and the impeller indicate the degree of their respective deflections by inducing pulse energy into a pair of stationary pickup coils positioned adjacent the path of magnets on the rotating drum and the deflected impeller. The time difference between successive pulses from the drum pickup coil and the impeller pickup coil, referred to as $\Delta t$, is representative of the mass flow rate of the fluid. The mass flow rate is in most instances the most important information concerning flow rate of a fluid. The mass flow rate of fuel, for instance, is monitored in engine testing procedures to provide an indication of engine condition, and in actual engine use to provide information concerning the rate at which fuel is being used, or the quantity of fuel remaining.

Prior art mass flowmeters, however, are relatively slow in responding to transient changes in flow and provide no information as to density or volumetric flow rate. Since mass is equal to volume times density, sudden changes in either the volume (i.e., speed of the fluid) or the density of the fluid should quickly affect the actual mass flow as well. However, mass flowmeters are slow in responding to changes in flow because a significant time constant is inroduced by the circuitry converting the $\Delta t$ pulses into a corresponding DC signal for operation of the indicating circuitry, as well as by the natural resonant frequency of the spring connecting the drum and the impeller.

Accordingly, it is a general object of the present invention to provide a flowmeter which overcomes the disadvantages of prior art mass flowmeters discussed above.

It is another object of the present invention to provide a flowmeter which provides an adjusted mass flow output signal representative of the mass flow rate, which reflects changes in the volume flow of fluid substantially as they occur.

It is a further object of the present invention to provide such a flowmeter which uses electrical signals representative of mass flow and volumetric flow to generate the adjusted mass flow output signal.

It is yet another object of the present invention to provide such a flowmeter which also generates such electrical signals representative of mass flow and volume flow in a single flowmeter unit.

It is a still further object of the present invention to provide such a flowmeter which may be utilized with existing flowmeters providing electrical signals representative of mass and volumetric flow signal information.

SUMMARY OF THE INVENTION

The improved flowmeter includes means for generating a fast response signal representative of the volumetric flow of a fluid, which signal is multiplied by a control signal representative of the density of the liquid to produce an adjusted mass flow output signal which reflects changes in volume flow substantially as they occur.

Means are provided for monitoring the density of the fluid and generating the control signal. More specifically, the density of the fluid is monitored by comparing a portion of the adjusted mass flow output signal from the circuit of the preferred embodiment with a signal from a standard mass flowmeter circuit. A difference signal, if any, obtained thereby is in turn used to alter the control signal until the two compared signals are equal.

In a further aspect of the invention, the multiplied volumetric flow signal has introduced into it a time constant comparable to the response time constant of the standard mass flowmeter circuit, and the now delayed multiplied volumetric flow signal is applied to the comparator, such that transient changes in volume flow alone will not affect the control signal representing the density of the fluid.

DESCRIPTION OF THE DRAWINGS

These and other features, objects and advantages of the invention will become more evident from the following description taken in conjunction with the accompanying drawings in which:

FIG. 4 is a signal diagram showing the response of the circuit of FIG. 2 at various points thereof to a step change in fluid density.

FIG. 5 is a signal diagram showing the response of the circuit of FIG. 2 at various points thereof to a step change in the volumetric flow rate of fluid.

DESCRIPTION OF THE PREFERRED EMBODIMENT

The flowmeter of the preferred embodiment includes means for generating two sets of flowmeter signals, one set of flowmeter signals being conventionally representative of the mass flow rate of a fluid, and the other set being conventionally representative of the volumetric flow rate of the fluid. By conventionally representative it is meant that the two sets of flowmeter signals are similar in configuration and response to that produced by known mass and volumetric flowmeters.

Figure 1:
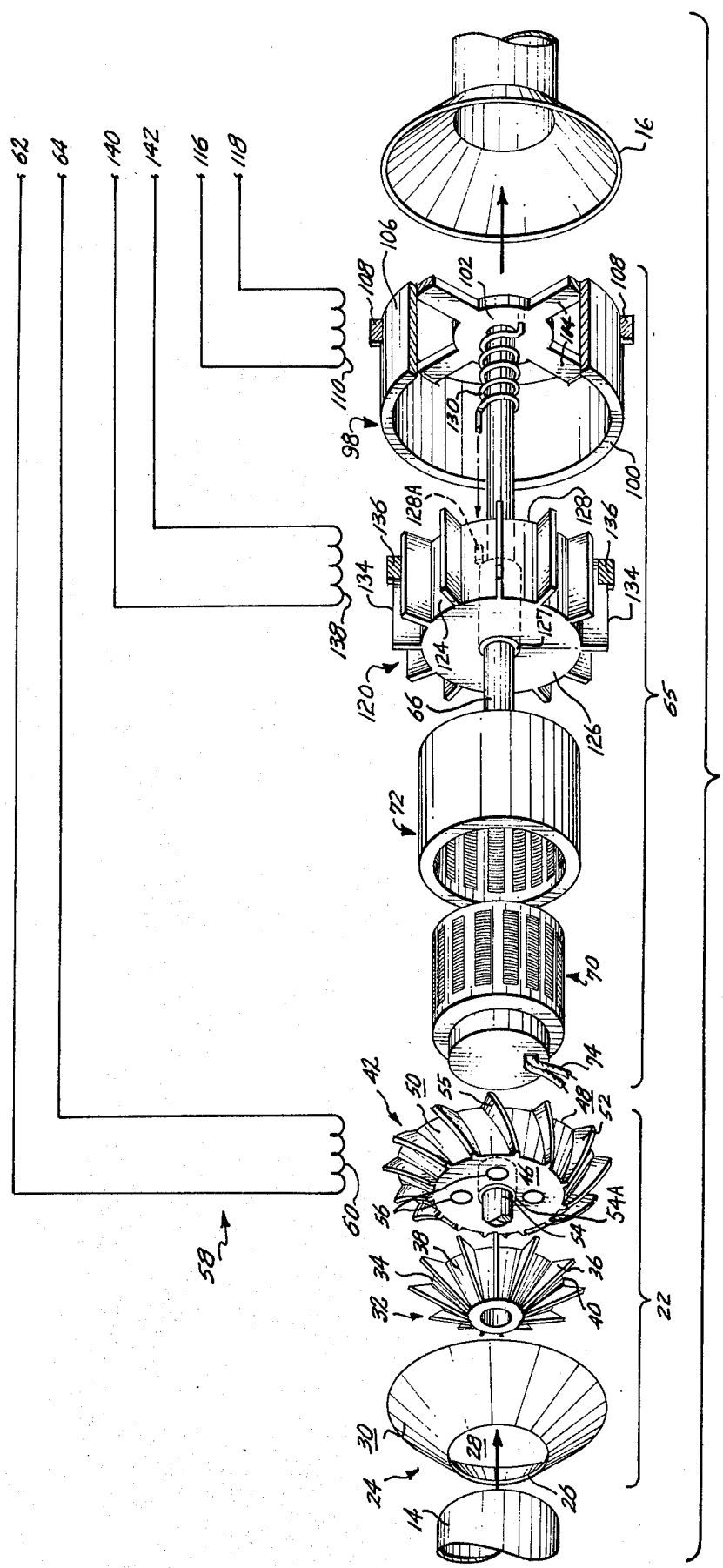
FIG. 1 is a pictorial representation of a flowmeter generating both volumetric and mass fuel flow information.

The mass and volumetric flow signals may be provided by the novel hybrid apparatus shown pictorially in FIG. 1. Referring to FIG. 1, the portion of the flowmeter which senses the mass and volume flow rates of the fluid referred to as the measurement assembly is shown generally at 12, and includes an entry port 14, into which the flowing fluid to be measured is directed, and an exit port 16, from which the fluid proceeds to its destination. A housing, not illustrated, is provided which surrounds the measurement assembly for containing the fluid in its passage from entry port 14 to exit port 16. The electrical signals generated by the measurement assembly portion of the flowmeter, which are representative of mass and volumetric flow, as will be hereafter clarified, are applied to the measurement electronics portion of the flowmeter, which is typically located adjacent the measurement assembly portion of the flowmeter apparatus and which produces the adjusted mass flow output signal. The adjusted mass flow output signal, which is representative of mass fluid flow with substantially immediate transient response is then typically applied to an indicator which provides a visual read-out of the flow rate.

When fluid is directed into the flowmeter 12 through entry port 14, it will encounter initially a measurement assembly for determining its volumetric flow shown generally at 22. The fluid first encounters a bypass shroud 24 which takes the form of a conical section having its apex end 26 positioned nearest the entry port 14, the bypass shroud 24 being positioned axially coincident with the flow of fluid through the hybrid flowmeter 12. The apex end 26 of the bypass shroud 24 has a circular opening 28 defined therein, through which a portion of the fluid entering the flowmeter at entry ports 14 flows. Approximately 60 to 70 percent of the flowing fluid is bypassed from the volumetric measurement assembly 22 and instead of proceeding through opening 28, it flows adjacent the outer peripheral surface 30 of the bypass shroud 24. The bypassed portion of the fluid joins the measured portion and is passed through a flow straightener (not shown) in the flowmeter to a mass measurement assembly generally indicated at 65.

That portion of the fluid entering flowmeter 12 at entry port 14 which passes through circular opening 28 in the bypass shroud 24 is directed to a flow straightening element 32 which is axially aligned with the bypass shroud 24 and generally with the flow of fluid through circular opening 28. The flow straightening element 32 comprises a thin circular metal plate 34 which is positioned generally perpendicular to the flow of fluid through circular opening 28, and a plurality of generally triangular shaped vanes 36, one edge of each vane being connected to the surface 38 of the plate 34 facing the bypass shroud 24. The vanes are arranged on plate 34 such that they are perpendicular thereto and such that a small portion of one apex of each triangular vane 36 extends beyond the circumferential edge 40 of the circular plate 34. The flowing fluid passes between the parallel vanes 36 and around the circumferential edge 40 of the circular plate 34. The flow straightening element 32 is stationary and operates to remove any angular momentum from the fluid flowing through the opening 28 in bypass shroud 24.

The flowing fluid next encounters turbine 42. Turbine 42 is a generally circular, plate-like element positioned substantially perpendicular to the flowing fluid. Turbine 42 includes front and rear opposing surfaces 46 and 48, respectively, which are joined by a peripheral edge 50 which angles outward from front surface 46 adjacent flow straightening element 32 to rear surface 48, relative to the direction of flowing fluid. Positioned along said peripheral edge 50 are a series of thin, spaced rectangular turbine vanes 52, each turbine vane 52 positioned on said peripheral edge 50 preferably at 45° relative to the direction of fluid flow. Each of the vanes 52 is positioned upstanding approximately ¼ inch on peripheral edge 50 and extends substantially across the edge 50. A set of bearings, not illustrated, is positioned within a bore 54A of the turbine 42 such that turbine 42 is free to revolve in a plane around a shaft 54 perpendicular to the direction of fluid flow, due to the action of the flowing fluid upon the one surface 55 of the turbine vanes 52 initially presented to the flowing fluid. A plurality of spaced magnets 56 are positioned concentric with the peripheral edge 50 at some point between the center of the turbine 42 and the peripheral edge 50.

A turbine pickoff circuit is represented by circuit 58, and includes a coil 60, into which is induced an electrical pulse each time one of the magnets 56 passes by coil 60. The coil 60 is typically mounted in a metal housing (not shown) positioned axially adjacent the turbine 42, the housing including a fluid repellent seal to protect the coil from the flowing fluid. The signal present at the turbine pickoff circuit output connections 62 and 64 is a sinusoidal signal having a frequency proportional to the speed of rotation of the turbine, which in turn is proportional to the volumetric flow rate of the fluid. Thus, the signals present at output connections 62 and 64 are representative of the volumetric flow rate, and are applied as one input signal set to the circuit of FIG. 2, as hereinafter explained.

The flowing fuel next passes through the previously-mentioned flow straightener, not illustrated, and encounters the mass flow measurement assembly portion of the hybrid flowmeter, which portion is shown generally at 65. The mass flow measurement assembly portion 65 typically includes an elongated shaft 66 which extends in an axial direction coincident with the direction of fluid flow. The shaft 66 is rotated either by a motor assembly 68 or by a turbine assembly (not shown).

Motor assembly 68 preferably comprises a stator assembly 70 mounted inside the housing (not illustrated) defining the fluid flow path and a rotor assembly 72 connected to the shaft 66 and supported by means not illustrated for rotation about the stator assembly 70. A motor drive electronics circuit (not illustrated) provides drive signals to the stator assembly through connecting wires 74.

Positioned downstream from the rotor assembly 72 is a flow drum 98. Flow drum 98 is an important part of the mass flow measurement assembly, as it provides a reference signal for establishing the mass flow rate. The flow drum 98 includes a hollow cylinder 100 positioned concentric with shaft 66. At least one disc member 102 is provided, positioned perpendicular to shaft 66 and having an opening defined therein which receives shaft 66, disc member 102 being engaged with shaft 66 such that rotation of shaft 66 rotates disc member 102. The disc member 102 has a diameter preferably substantially less than the diameter of hollow cylinder 100. Rigidly interconnecting disc member 102 and hollow cylinder 100 are a plurality of radially extending connections 104, resulting in the coincident rotation of hollow cylinder 100 when shaft 66 is rotated by the rotor assembly 72.

Positioned preferably on an exterior surface 106 of hollow cylinder 100 are a plurality of spaced magnets 108. Positioned stationary adjacent the path defined by magnets 108 when flow drum 98 is rotated is a flow drum pickoff coil 110, into which is induced a sinusoidal voltage by the movement of magnets 108 relative to the stationary pickoff coil 110. The sinusoidal signal induced in the flow drum pickoff coil 110 is applied to a pair of flow drum output connections 116 and 118.

An impeller 120 is situated upstream of flow drum 98 and in assembly is located entirely within cylinder 100 thereof. The impeller 102 preferably comprises a solid cylinder 124 having a diameter somewhat smaller than the diameter of flow drum 98 and including a near end 126 having a central opening 127 therein which extends through cylinder 124 to a far end 128 thereof. In assembly, shaft 66 extends through opening 127 and supports cylinder 124 for rotation through a set of bearings, not illustrated. A calibrated torque spring 130 is located about shaft 66 and has one end secured in a slot 128A extending from the far end 128 of cylinder 124 inwardly and a second end similarly secured to disc member 102 to connect impeller 120 to flow drum 98.

Positioned upstanding on and substantially perpendicular to peripheral surface 132 of cylinder 124 and connecting the near end and far end thereof, respectively, are a plurality of thin impeller vanes 134 which are parallel with the fluid flow. Located at spaced intervals on the peripheral surface 132, and preferably on spaced ones of impeller vanes 134 are a plurality of impeller magnets 136. In operation, as the shaft 66 continuously rotates, the impeller 120 will also attempt to rotate under the influence of spring 130 and thereby impart an angular momentum to fluid flowing between the impeller vanes 134.

The torque required to impart an angular momentum to the fluid will result in a rotational deflection of the impeller 120 relative to flow drum 98. The greater the mass flow rate, the larger the deflection of the impeller 120 relative to the flow drum 98. Since the spring 130 has a linear torque/deflection characteristic, the magnitude of the deflection of the impeller 120 relative to the flow drum 98 is linearly proportional to the mass flow rate of the fluid. As the impeller 120 and, hence, the impeller magnets 136, rotate under the influence of rotating shaft 66, a sinusoidal signal will be induced in stationary impeller pickoff coil 138 which is positioned adjacent to the path traveled by impeller magnets 136 as impeller 120 rotates. The induced signal is applied to impeller output connections 140 and 142. The respective sinusoidal signals appearing at output connections 116, 118 and 140, 142, are out of phase, due to the deflection of the impeller 120 relative to flow drum 98, and this phase difference, as measured by time difference or $\Delta t$, is proportional to the mass flow rate of the fluid. The difference signal $\Delta t$ is applied to the circuit of FIG. 2 as the mass flow signal.

Figure 2:
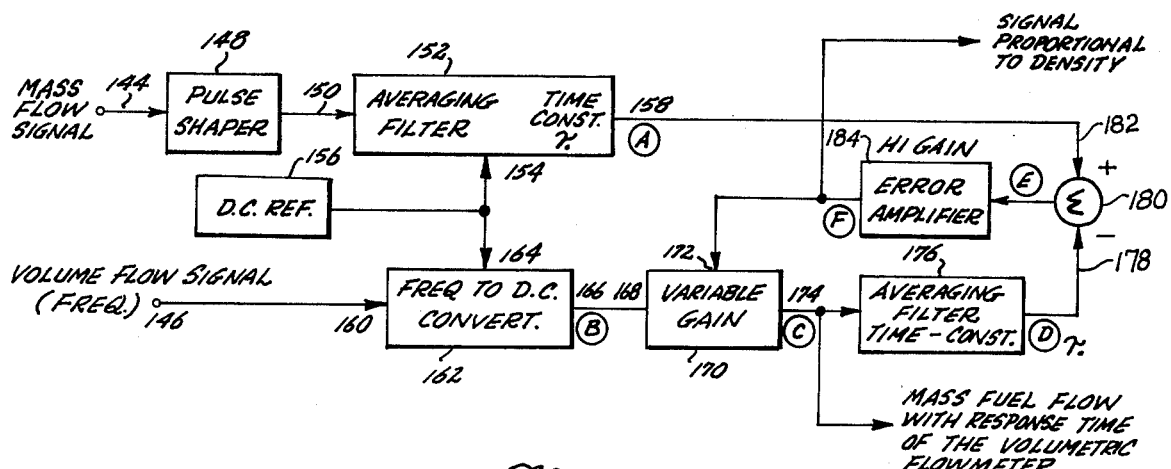
FIG. 2 is a block diagram of the flowmeter circuit producing adjusted mass flow output signals representative of mass flow with improved transient response.

Referring now to FIG. 2, which shows the measurement electronics of the flowmeter, signals representative of mass flow are applied at input connection 144 and signals representative of volumetric flow are applied at input connection 146. The mass flow signals at input 144 comprise the pulses on lines 116, 118, 140 and 142, the time separation of which is representative of the mass flow rate, and are applied to a pulse shaper 148. Pulse shaper 148 functions to generate a pulse width signal from those pulses present on input 144. The pulse width signal is proportional to mass flow rate and is applied to one input 150 of an averaging filter circuit 152. Applied to the other input 154 of averaging filter circuit 152 is a DC reference signal from reference source 156. The filter 152 provides a DC signal at output 158 which has a magnitude which is some fraction of the magnitude of the DC reference signal, as determined by the duration of the pulses at input 150 relative to the pulse interval. In operation, the averaging filter 152 introduces a time constant or delay Y of approximately 10 seconds in converting the pulses applied at input 144 into a mass flow DC signal at output 158. Thus, changes in the mass flow rate at input 144 are delayed approximately 10 seconds by the averaging circuit 152. The output 158 of averaging filter 152 is referenced as circuit point A.

The volumetric flow signals applied to input connection 148 are approximately sinusoidal, the frequency of which is proportional to the volumetric flow rate. The signal at input 148 is applied to one input 160 of a frequency-to-DC-converter 162. Applied at the other input 164 of frequency-to-DC-converter 162 is the DC reference signal from reference source 156, which is also applied to input 154 of averaging filter 152. The frequency-to-DC-converter 162 operates to produce a DC output signal at output 166 having a magnitude which is some fraction of the magnitude of the DC reference voltage from source 156, as determined by the frequency of the signal at input 164. Output 166 is referenced as circuit point B.

The DC signal at the output 166 of frequency-to-DC-converter 162, representative of the volumetric flow, is then applied to one input 168 of a variable gain amplifier 170. Applied to the other input 172 of variable gain amplifier 170 is a signal representative of the density of the fluid being measured. The manner in which the signal representative of fuel density is obtained will be more fully explained in following paragraphs. The signal at input 172 controls the gain of the amlifier 170, and thus the amplitude of the signal at its output 174 relative to the amplitude of the signal at input 168. A multiplying function is thus accomplished between the signals at inputs 168 and 172, resulting in a signal at its output 174 which is the product of the volumetric flow DC signal and the liquid density. Since mass is equal to volume (the signal at input 168) times density (the signal at input 172), the signal at the output 174 of variable gain amplifier 170 is representative of the mass flow. This is referred to as the adjusted mass flow output signal. Transient changes in the volumetric flow rate, as indicated at input 146, will be nearly instantaneously reflected in changes of the adjusted mass flow output signal at output 174, since the mass flow rate is obtained indirectly through use of signals representative of the density of the fluid being measured and the volumetric flow rate of the fluid, thus eliminating the long delay Y introduced by the averaging filter 152. The adjusted mass flow output signal is then typically applied to a flow indicator (not shown). The output 174 of the variable gain amplifier is referenced as circuit point C.

A portion of the adjusted mass flow output signal at output 174 of variable gain amplifier 170 is also applied to a filter 176 which has a time constant or delay Y substantially equal to the time constant Y of averaging filter 152. The output of the filter 176 is referenced as circuit point D. The filtered DC signal appearing at the output of filter 176 is applied to the inverting input 178 of summing amplifier 180. Applied to the noninverting input 182 of summing amplifier 180 is the signal present at the output 158 (circuit point A) of averaging filter 152. The output of the summing amplifier 180 is referenced as circuit point E, and the signal present at circuit point E from summing amplifier 180 is applied to the input of error amplifier 184.

Error amplifier 184 operates to integrate the signal applied to its input. In steady state, that is, when the signals at the respective inverting and noninverting inputs of summing amplifier 180 are not changing, the signal from error amplifier 184, referenced as circuit point F, will be representative of the density of the flowing fluid. This signal is, as mentioned above, applied to input 172 of variable gain amplifier 170. Thus a continuous monitoring is accomplished of the density of the fluid being measured, and an electrical signal representative of the density of the fluid is generated which is in turn used to generate the adjusted mass flow output signal which quickly reflects changes in volumetric flow rate.

The operation of the circuit shown in FIG. 2 may perhaps be more readily understood by reference to FIGS. 4 and 5, which show the signal response at circuit points A through F to a step change in fluid density (FIG. 4) or volumetric flow rate (FIG. 5). Referring to FIG. 4, one should assume that a step increase in fluid density occurs at a time $T_1$ and that no change occurs in the actual mass flow rate. Signals 186 and 188, respectively, represent the magnitude of the DC voltage present at circuit points A and B, relative to a zero or other reference level. As noted above, assuming that the mass flow does not change, the level of signal 186 will remain the same while the signal 188, representative of volumetric flow, immediately decreases at time $T_1$. The signal 188 is applied to variable gain amplifier 170, which introduces approximately a 10 millisecond time constant to the signal 188, providing the more gradually decreased signal represented by signal 189 at circuit point C. If the signal applied at input 172 of variable gain amplifier 170, which is representative of the fluid density, the signal output of the flowmeter at circuit point C will remain decreased, as shown by dotted line 189a, which would be an erroneous reading, since the mass flow rate has been assumed to remain the same.

The signal 189 is applied to the filter 176 which introduces a 10 second time delay constant into it, thus making the gradual decrease to a lower volumetric flow rate signal much more gradual, as illustrated by signal 192 in diagram D of FIG. 4. The signal 192, which is the output of filter 176, will remain at a lowered level as shown by dotted line 192a if the density signal does not change in magnitude. The signal 192 from the filter 176 is then applied to the inverting input of summing amplifier 180, as noted above. The input to the noninverting input of summing amplifier 180 is the mass flow rate signal 186 shown in diagram A in FIG. 4. Assuming steady state condition until time $T_1$, the error output from summing amplifier 180 before time $T_1$ will be such to maintain the proper density signal output. However, when the signal 192 (circuit point A) to the inverting input from filter 176 begins to drop, in accordance with the decrease in volumetric flow rate and at a rate determined by the filter 176 time constant, an error signal 194 from the output of the summing amplifier 180 begins to rise in magnitude in a mirror-image fashion to the decrease in the signal 192. The error signal 194 is integrated by error amplifier 184, which, accordingly, produces a gradually increasing signal 196, shown in part F of FIG. 4, signal 196 rising towards a new signal level representative of the increased density of the fluid. The change in the density signal 196 results in corresponding changes in signals of circuit points C and D, as shown by signals 189b and 192b, until they are once again at their predensity increase levels, at which point the circuit is again in steady state.

Referring now to FIG. 5, assume the volumetric flow rate of the fluid to increase in a step manner at time $T_1$ and that the density of the fluid remains constant. In response, since mass is equal to volume times density, the mass flow signals at input connection 144 will immediately increase correspondingly in width. However, the averaging filter 152 will introduce approximately a 10 second time constant before the signal 200 at circuit point A reaches the correct corresponding DC level. This is shown as dotted line 200a in diagram A of FIG. 5. As noted above, this delayed response is undesirable because information concerning transients is frequently needed more quickly. Signal 202 at circuit point B, however, will increase substantially coincident with the immediate step change in volumetric flow, since frequency-to-DC-converter 162 introduces a time delay in response of only a few milliseconds. Signal 202 will thus increase to its new level within a few milliseconds after the actual increase in volumetric flow rate. Signal 202, which is the output of frequency-to-DC-converter 162 is then multiplied by the density signal, which is unchanged immediately after $T_1$ to provide a signal 206, which is representative of the mass flow rate, but which follows changes in volumetric flow rate very quickly. Thus, as shown in FIG. 5, the mass flow rate signal 206 has risen to its new level in view of the sudden increase in volumetric flow within a few milliseconds of the actual increase in volumetric flow. This results in a mass flow rate signal at circuit point C which has a transient response dependent only on the response time of the frequency-to-DC-converter and the variable gain amplifier 170, which are typically small compared to the response time of the averaging filter 152.

To prevent the density signal from changing, the filter 176 introduces a time constant to the signal at circuit point C equal to the time constant of averaging filter 152. Thus, the signal 208 in diagram D at the noninverting input 182 of summing amplifier 180 from filter 176 rises in identical fashion to the rise in signal 202 at the inverting input 184 from circuit point A. The error output of summing amplifier 180 thus remains at zero, as shown in diagram E of FIG. 5, and the signal level at circuit point F representative of the density of the fluid remains at its correct magnitude, as illustrated by diagram F in FIG. 5.

Figure 3:
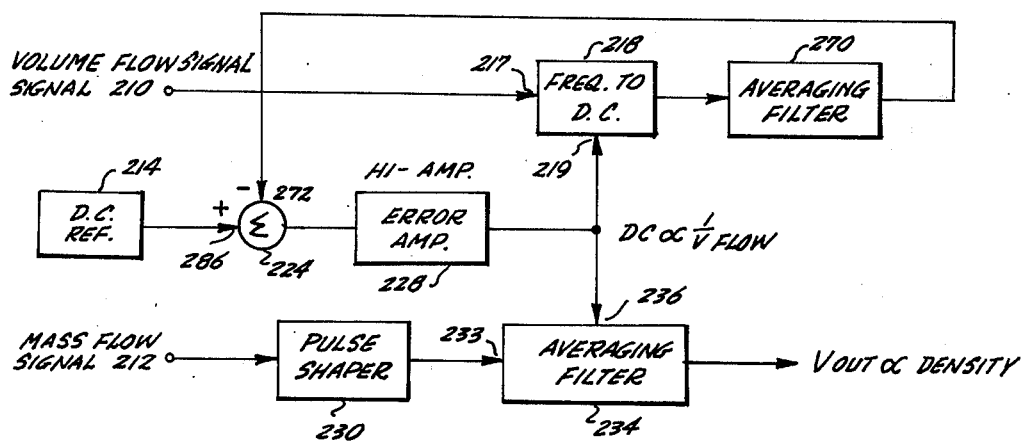
FIG. 3 is a block diagram of an alternative embodiment using the principles of the present invention to provide fluid density information.

FIG. 3 illustrates another embodiment of the present invention for measuring the density of fluid. Volumetric flow signals and mass flow signals are present at circuit inputs 210 and 212, respectively. A DC reference signal is provided by source 214. The volumetric flow signals are applied to one input 217 of a frequency-to-DC-converter 218, the output of which is applied to an averaging filter 220, the output of which is in turn applied to an inverting input 222 of summing amplifier 224. The signal from DC reference source 214 is further applied to the noninverting input 226 of summing amplifier 224. The output of the summing amplifier 224 is applied to an error amplifier 228, the output of which is connected to a second input 219 of the frequency-to-DC-converter 218. The signal at the output of error amplifier 228 is inversely proportional to the volumetric flow rate, such that the DC level of the error amplifier output signal increases as the volumetric flow rate decreases and vice versa.

The mass flow signals are applied from input connection 212, to a pulse shaper 230, which generates a pulse width signal, the pulse width signal in turn being applied to one input 233 of averaging filter 234. The other input 236 of averaging filter 224 is the output signal from the error amplifier 228, which, as explained above, is inversely proportional to the volumetric flow rate. The averaging filter is thus responsive to the mass flow signals in the form of a pulse width, and a DC signal from error amplifier 228 which is inversely proportional to the volumetric flow rate. Thus, the output of averaging filter 234 is proportional to the mass flow divided by the volume flow rate, and thus proportional to fluid density. The output of averaging filter 234 may in turn be applied to an indicator for visual readout of the actual fluid density.

Thus, a flowmeter has been disclosed which is responsive to conventional mass flow signals and volumetric flow signals to generate an adjusted mass flow output signal which has an improved response to transient changes in volumetric flow rate. The flowmeter circuit operates by obtaining a value of fluid density from the conventional mass flow and volumetric flow signals, and then effectively multiplies the volumetric flow signals by the signal representing the fluid density to obtain the desired mass flow signal.

Although an exemplary embodiment of the invention has been disclosed for purposes of illustration, it should be understood that various changes to the preferred embodiment may be made without departing from the spirit of the invention as defined by the claims.

What is claimed is:

1. An apparatus for measuring changes in the mass flow rate of a fluid substantially as they occur, comprising:
    first means generating a first signal proportional to the mass flow rate of the fluid;
    second means generating a second signal proportional to the volumetric flow rate of the fluid and which changes substantially simultaneously with changes in the volumetric flow;
    means responsive to said first and second signals for generating a control signal proportional to the density of the fluid; and,
    means for multiplying said second signal and said control signal together, thereby generating an output signal which is proportional to the mass flow rate of the fluid and which changes substantially simultaneously with changes in the volumetric flow.

2. An apparatus of claim 1, wherein said control signal generating means includes means for delaying said output signal for a predetermined time and means for comparing said delayed output signal with said first signal, any difference between said output signal and said first signal resulting in an error output from said comparing means and a corresponding change in said control signal.

3. An apparatus of claim 2, wherein said multiplying means is a variable gain amplifier and said delay means is a filter, said variable gain amplifier having a gain proportional to said control signal, a portion of the output of said variable gain amplifier being applied to said filter.

4. An apparatus for measuring the density of a flowing fluid, comprising:
    first means generating a series of pulses having a pulse separation proportional to the mass flow rate of the fluid;
    second means for generating a substantially sinusoidal signal having a frequency proportional to the volumetric flow rate of the fluid;
    means generating a DC reference signal;
    first circuit means responsive to said second means and said DC reference signal for generating a control signal which is inversely proportional to the volumetric flow rate of the fluid; and,
    means responsive to said series of pulses and said control signal for generating an output signal proportional to the density of the fluid.

5. An apparatus of claim 4, wherein said first circuit means comprises in series connection, a comparator, an error amplifier, a frequency-to-DC-converter responsive to said sinusoidal signal, and a filter, the output of said error amplifier being a DC signal which is inversely proportional to the volumetric flow rate of the fluid.

6. A circuit for use in an apparatus for measuring changes in the mass flow rate of a fluid substantially as they occur which includes means generating a first signal proportional to the mass flow rate of the fluid, and means for generating a second signal proportional to the volumetric flow rate of the fluid and which changes substantially simultaneously with changes in the volumetric flow, the circuit comprising:
    means responsive to the first and second signals for generating a control signal proportional to the density of the fluid; and,
    means for multiplying the second signal and said control signal together, thereby generating an output signal which is proportional to the mass flow rate of the fluid and which changes substantially simultaneously with changes in the volumetric flow.

7. An apparatus of claim 6, wherein control signal generating means includes means for delaying said output signal for a predetermined time and means for comparing said delayed output signal with said first signal, any difference between said output signal and said first signal resulting in an error output from said comparing means and a corresponding change in said control signal.

8. An apparatus of claim 7, wherein said multiplying means is a variable gain amplifier and said delay means is a filter, said variable gain amplifier having a gain proportional to said control signal, a portion of the output of said variable gain amplifier being applied to said filter.

* * * * *